United States Patent
Jones et al.

(10) Patent No.: US 7,228,582 B1
(45) Date of Patent: Jun. 12, 2007

(54) EXTENDABLE RAMP FOR BOATS AND VEHICLES

(75) Inventors: Billy Gene Jones, Norman, OK (US); William D. Hamil, Norman, OK (US)

(73) Assignee: Pro-Ramp Electric, LLC, Norman, OK (US)

( * ) Notice: Subject to any disclaimer, the term of this patent is extended or adjusted under 35 U.S.C. 154(b) by 39 days.

(21) Appl. No.: 11/156,217

(22) Filed: Jun. 17, 2005

Related U.S. Application Data

(60) Provisional application No. 60/580,547, filed on Jun. 17, 2004.

(51) Int. Cl.
*E01D 1/00* (2006.01)

(52) U.S. Cl. .......................... 14/71.1; 14/69.5; 414/921

(58) Field of Classification Search ................ 414/537, 414/921; 14/69.5, 71.1
See application file for complete search history.

(56) References Cited

U.S. PATENT DOCUMENTS

| | | | |
|---|---|---|---|
| 4,011,615 A | | 3/1977 | Maxson |
| 4,293,967 A | | 10/1981 | Ord |
| 4,993,341 A | | 2/1991 | Merkel |
| 5,085,164 A | | 2/1992 | Whitton |
| 5,085,165 A | | 2/1992 | Reed |
| 5,380,144 A | * | 1/1995 | Smith et al. ................. 414/537 |
| 5,636,399 A | * | 6/1997 | Tremblay et al. ............. 14/71.1 |
| 5,775,232 A | * | 7/1998 | Golemis et al. ............. 105/458 |
| 5,832,555 A | * | 11/1998 | Saucier et al. ............... 14/71.1 |
| 6,010,298 A | * | 1/2000 | Cohn et al. .................. 414/537 |
| 6,058,866 A | | 5/2000 | May |
| 6,186,733 B1 | * | 2/2001 | Lewis et al. ................. 414/537 |
| 6,203,265 B1 | * | 3/2001 | Cohn et al. .................. 414/537 |
| 6,210,098 B1 | * | 4/2001 | Cohn et al. .................. 414/537 |
| 6,238,168 B1 | * | 5/2001 | Cohn et al. .................. 414/537 |
| 6,298,801 B1 | | 10/2001 | May |
| 6,409,458 B1 | * | 6/2002 | Cohn et al. .................. 414/537 |
| 6,616,396 B2 | * | 9/2003 | Sternberg .................... 414/538 |
| 6,843,635 B2 | * | 1/2005 | Cohn .......................... 414/549 |
| 6,868,799 B2 | | 3/2005 | Wright |

* cited by examiner

*Primary Examiner*—Gary S. Hartmann
(74) *Attorney, Agent, or Firm*—James F. Harvey; Doerner Saunders Daniel & Anderson

(57) ABSTRACT

An extendable ramp apparatus is provided for automatically extending a ramp. The apparatus comprises a generally rectangular frame with a track for movement of a carriage pivotally connected to a ramp along the track. The ramp pivots downwardly as it is extends from the frame until it encounters a surface. A bidirectional motor is provided with a cabling arrangement to reciprocate the carriage and ramp along the track. Shock absorbers may slow the carriage movement as the ramp is extended so that hard contact of the ramp with a surface is minimized. An innovative capstan arrangement provides more rapid movement of the ramp as it retracts but provides more power during ramp extension, so that vertical movement of the ramp is slowed as the ramp is extended. The apparatus may find application in vehicles such as trucks, vans, and boats whenever it is desired to move goods or people between surfaces of different heights, such as a truck bed and the ground.

17 Claims, 6 Drawing Sheets

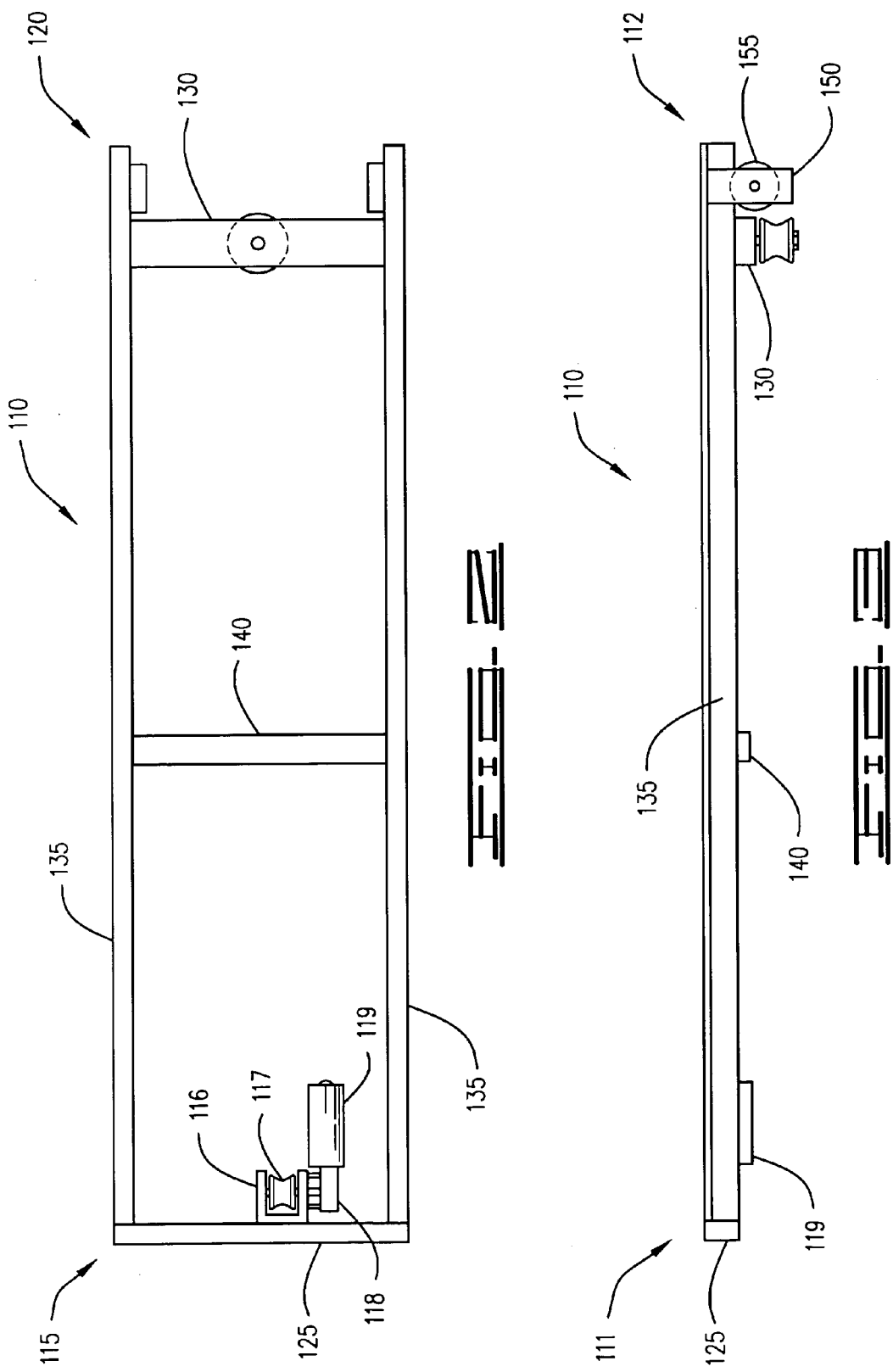

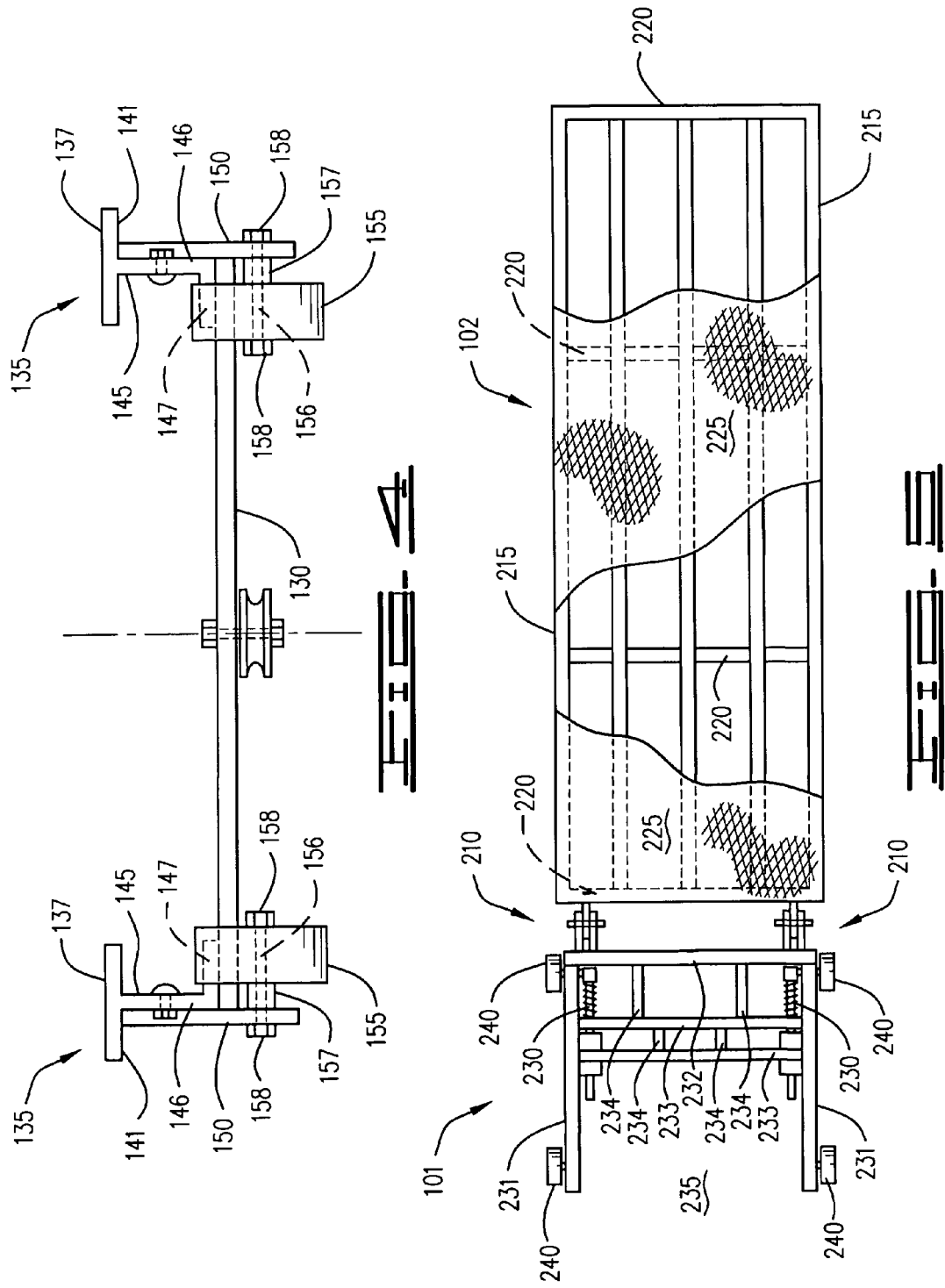

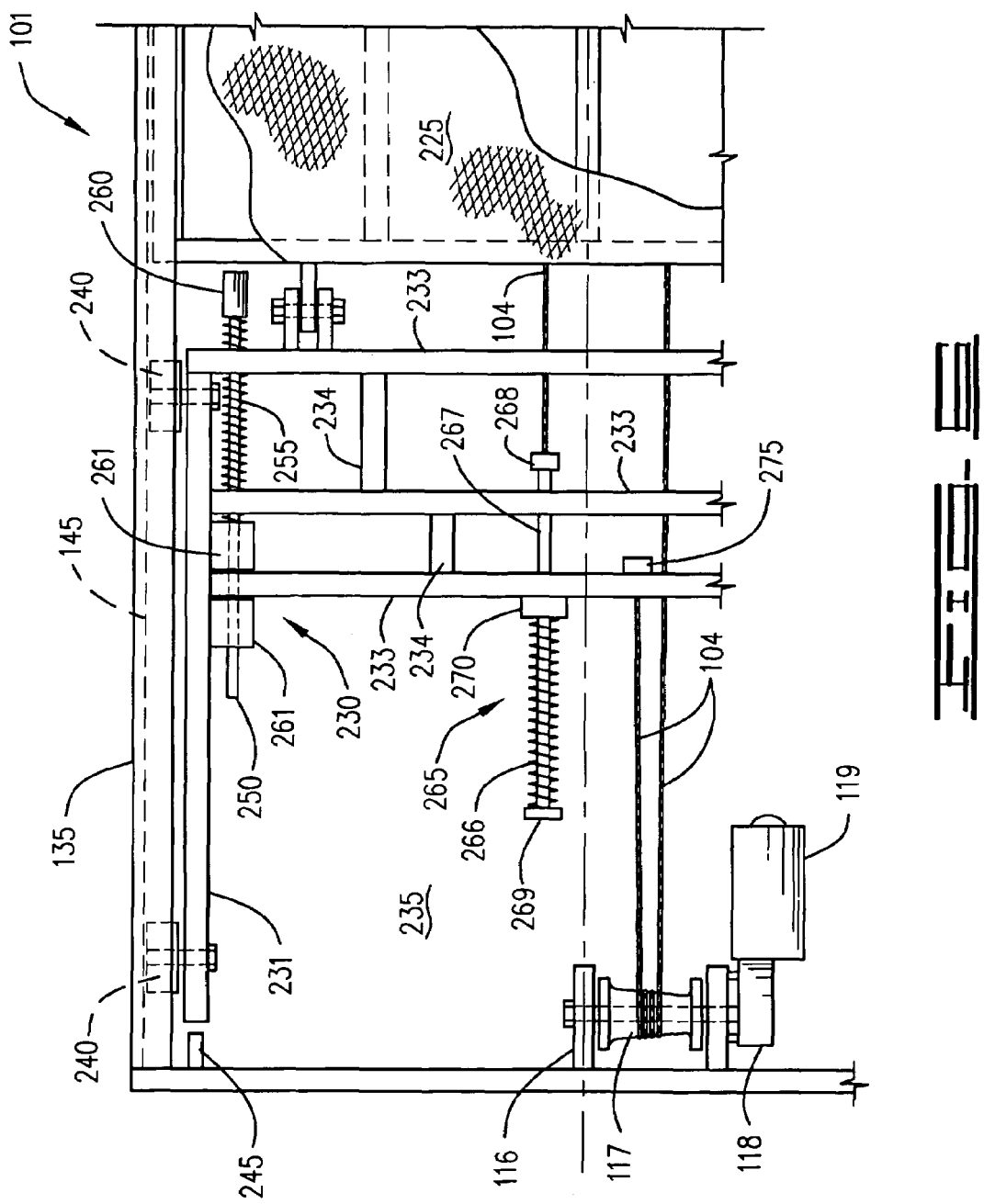

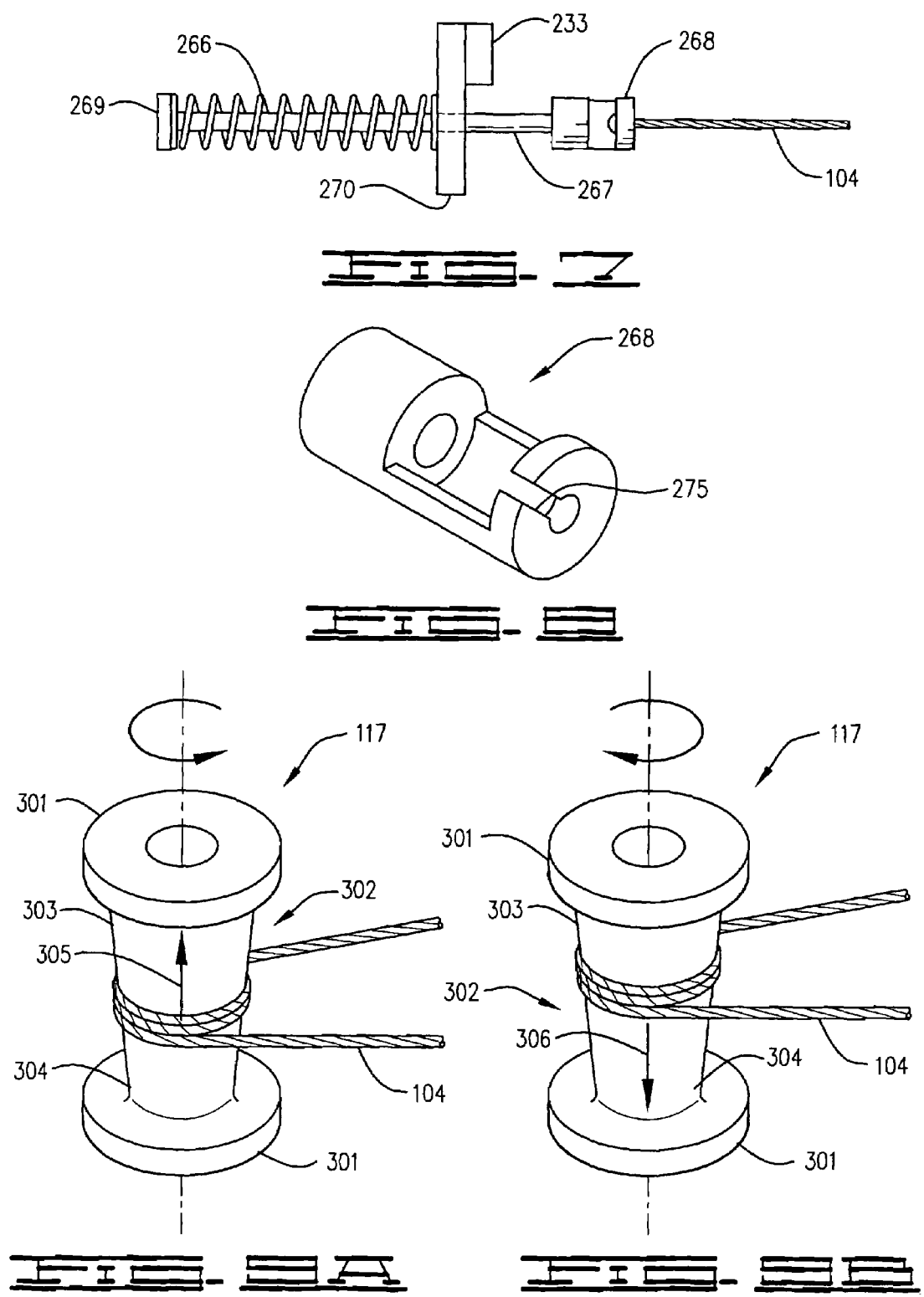

EXTENDABLE RAMP FOR BOATS AND VEHICLES

CROSS-REFERENCES TO RELATED APPLICATIONS

This patent application claims the benefit of U.S. Provisional Application No. 60/580,547, entitled "Improved Gangplank", filed Jun. 17, 2004.

BACKGROUND OF THE INVENTION

The invention relates generally to extendable surfaces for supporting people and material for movement between two structures at a height. More specifically, the invention relates to extendable platforms or ramps to assist loading and unloading boats and vehicles, and, more particularly, but not by way of limitation, it relates to an improved extendable gangplank for use in combination with a pontoon-type barge or boat.

Ramps are in common use for loading and unloading vehicles, by providing a smooth transition from vehicle to the loading area. Examples of ramp use are, for example, ramps used by furniture movers to enable them to easily move a piece of furniture from the ground to the truck body, which is usually several feet above the ground. Ramps are also used as gangplanks in the boating industry to allow personnel to move from the shore or dock to a boat without getting wet. The ramp is usually stored in the body of the vehicle or underneath its floor when it is no longer required. Such ramps are usually heavy and cumbersome, and several persons are usually called upon to manhandle the ramp into its storage position.

The prior art includes numerous ways in which the use of ramps, platforms, or gangplanks has been automated to allow a single person to position and store such a device. U.S. Pat. No. 4,011,615, issued to Maxson et al., discloses a bow gangplank that is intended for use on an offshore oil rig platform when violent wave action is present. It has a springloaded body that will elongate and shorten in accordance with wave inducements. The gangplank itself is not controllable from the boat but must be manipulated and maintained in position between the rig platform and docking vessel. However, it does feature a self adjusting feature that accommodates rough seas by extending and shortening the gangway to allow for movement of the ship during heavy seas. U.S. Pat. No. 4,293,967, issued to Ord, discloses a boat with a flip-over bow gangplank, wherein the gangplank in the stowed position is compactly maintained in trim against the bow form of the vessel. In docking, the gangplank is simply swung up and over to extend forward of the vessel onto a docking structure.

Other prior art stores the ramp or gangplank under the floor of the vehicle or boat. For example, U.S. Pat. No. 4,993,341, issued to Merkel, discloses an extendable gangplank for a pontoon boat, the gangplank being carried beneath the deck of the boat and extending outwardly under control of a DC motor. The extension mechanism consists of a combination of cables and pulleys which may be prone to jamming and interference by debris and other foreign matter in the water under the boat. The gangplank consists of a short portion and a long portion held together by hinges, so that when the long portion extends outwardly from the pontoon boat, the hinges will allow the long portion to drop from a horizontally extending position when the hinges extend over an outer supporting roller. No provision is made to slow the descent of the gangplank as it extends from the boat and this may present a danger to personnel on the shore.

U.S. Pat. No. 5,085,165, issued to Reed, also discloses another gangplank for a pontoon boat. The gangplank is pivotally connected to a guide section and is suspended from rollers below a deck of the boat between the pontoons. A central rib is provided along the underside of the gangplank, where the rib has two inclined portions joined at an apex with the portions riding on a fixed roller also mounted below the deck. When the gangplank is extended, the inclined portions function like a cam to lower the gangplank to a surface after the apex traverses the fixed roller, and when the gangplank is retracted, the gangplank is raised from the surface by cam action of the rollers. The gangplank is actuated by a cable having two ends connected to the guide section and powered by a winch.

U.S. Pat. No. 6,868,799, issued to Wright, discloses a ramp for a pontoon boat, where the ramp consists of a platform and a supporting structure for suspending the platform under a pontoon boat. The platform is supported on its distal end by a float and has a proximal end that is slidingly attached by blocks to a pair of parallel rails in the support structure. The apparatus has no rollers or a winching arrangement.

Each of these inventions provides an apparatus for extending and stowing a ramp or gangplank for a marine vehicle. Each becomes more complicated when an automated means for extending or retracting the gangplank is used. Furthermore, the clearance and space requirements of the apparatus, or its profile, is not particularly addressed in the prior art. Clearance is particularly important for land based vehicles such as trucks or vans, in order to maintain road clearance above the road surface. If the apparatus is mounted below the vehicle frame so that it extends toward the road surface, then it is prone to damage from road objects. Alternatively, if the apparatus is mounted above the vehicle frame, then the vehicle body may have to be raised to accommodate the apparatus. If this amount of elevation is excessive, then the center of gravity of the vehicle might change, resulting in a top heavy vehicle, which would therefore be less stable.

Thus as can be seen, there is a need for an improved extendable ramp apparatus that is simple, easily maintained, resistant to interference by debris or obstructions, and exhibits smooth operation. The apparatus should be lightweight so that it may be employed on a variety of vehicular platforms and corrosion resistant, particularly in a marine environment. It is desirable that the apparatus be as thin as possible in order to increase its utility for different vehicles. Finally, it is also desirable to prevent the ramp from rapidly dropping when it is extended so that people are not hurt and equipment is not damaged.

SUMMARY OF THE INVENTION

In one aspect of the invention, an extendable ramp apparatus is provided, where the apparatus comprises a generally rectangular frame with a front end, a back end, and two tracks each extending between the front end and the back end, the frame having a roller aligned with each track and positioned at the back end; a ramp with a first ramp end and a second ramp end; a carriage with a plurality of wheels engaging the tracks for reciprocal movement thereon, the carriage being pivotally attached to the first ramp end, the carriage oriented proximate the front end, the ramp oriented proximate the back end, so that the ramp is supported by the carriage and the rollers; and a motor attached to the frame, the motor arranged to move the carriage in a first direction towards the back end and in a second direction towards the front end, the motor controlled by a switch having a first position causing the carriage to move in the first direction and a second position causing the carriage to move in the second direction.

In another aspect of the invention, an extendable ramp apparatus for use beneath a horizontal surface is provided where the apparatus comprises a rectangular frame having a front member, a back member, and two side members extending between the front member and the back member, each side member with a track, the frame having a roller aligned with each track proximate the back member, the frame having a profile; a motor mounted on the front member within the profile of the frame; a carriage within the profile of the frame, the carriage having two opposed carriage side members aligned with the tracks, each carriage side member with a first end proximate the back member of the frame and a second end proximate the front member of the frame, the carriage side members held in spaced relationship by a carriage back member fixedly attached to the opposed first ends and by one or more carriage cross members proximate the carriage back member, each carriage side member with a plurality of wheels supporting the carriage side member within each track for reciprocal movement of the carriage along the tracks, wherein the motor does not come into contact with the carriage when the second ends of the carriage side members contact the front member; and a ramp within the profile of the frame, the ramp having a first ramp end and a second ramp end, the first ramp end pivotally connected with the carriage back member, and the second ramp end supported by the rollers, so that the motor is disposed to selectively move the carriage and ramp in a first direction and a second direction along the tracks.

In still another aspect of the invention, an extendable ramp system is provide, the system comprising a frame having a track; a carriage mounted on the track for reciprocal motion along the track; a ramp pivotally attached to the carriage; an actuating apparatus that comprises a reversible motor mounted on the frame, a capstan having a barrel driven by the motor, and a cable wrapped around the barrel with two ends connected to the carriage and arranged to extend the ramp when the motor is operating in a first direction and retract the ramp when the motor is operating in a second direction; and a shock absorber disposed to oppose without preventing downward motion of the ramp as it is extended beyond the frame by the carriage.

These and other features, aspects and advantages of the present invention will become better understood with reference to the following drawings, pictures, description and claims.

BRIEF DESCRIPTION OF THE DRAWINGS

FIG. 2 is a top view of a frame designed to support the ramp and carriage, according to an embodiment of the invention;

FIG. 3 is a side view of the frame, according to an embodiment of the invention;

FIG. 4 is an end view of the frame, according to an embodiment of the invention;

FIG. 5 is a top view of an extendable ramp attached to its carriage, according to an embodiment of the invention;

FIG. 6 is a top detailed view of the carriage and a portion of the ramp, according to an embodiment of the invention;

FIG. 7 is a side, detail view of a tensioning mechanism for maintaining tension on a drive wire, according to an embodiment of the invention;

FIG. 8 is a perspective view of an attachment means for attachment of the cable to a tensioning mechanism, according to an embodiment of the invention;

FIG. 9A is a perspective view of a tapered capstan turning in a counterclockwise direction, according to an embodiment of the invention;

FIG. 9B is a perspective view of a tapered capstan turning in a clockwise direction, according to an embodiment of the invention.

DETAILED DESCRIPTION OF THE INVENTION

Figure 1:
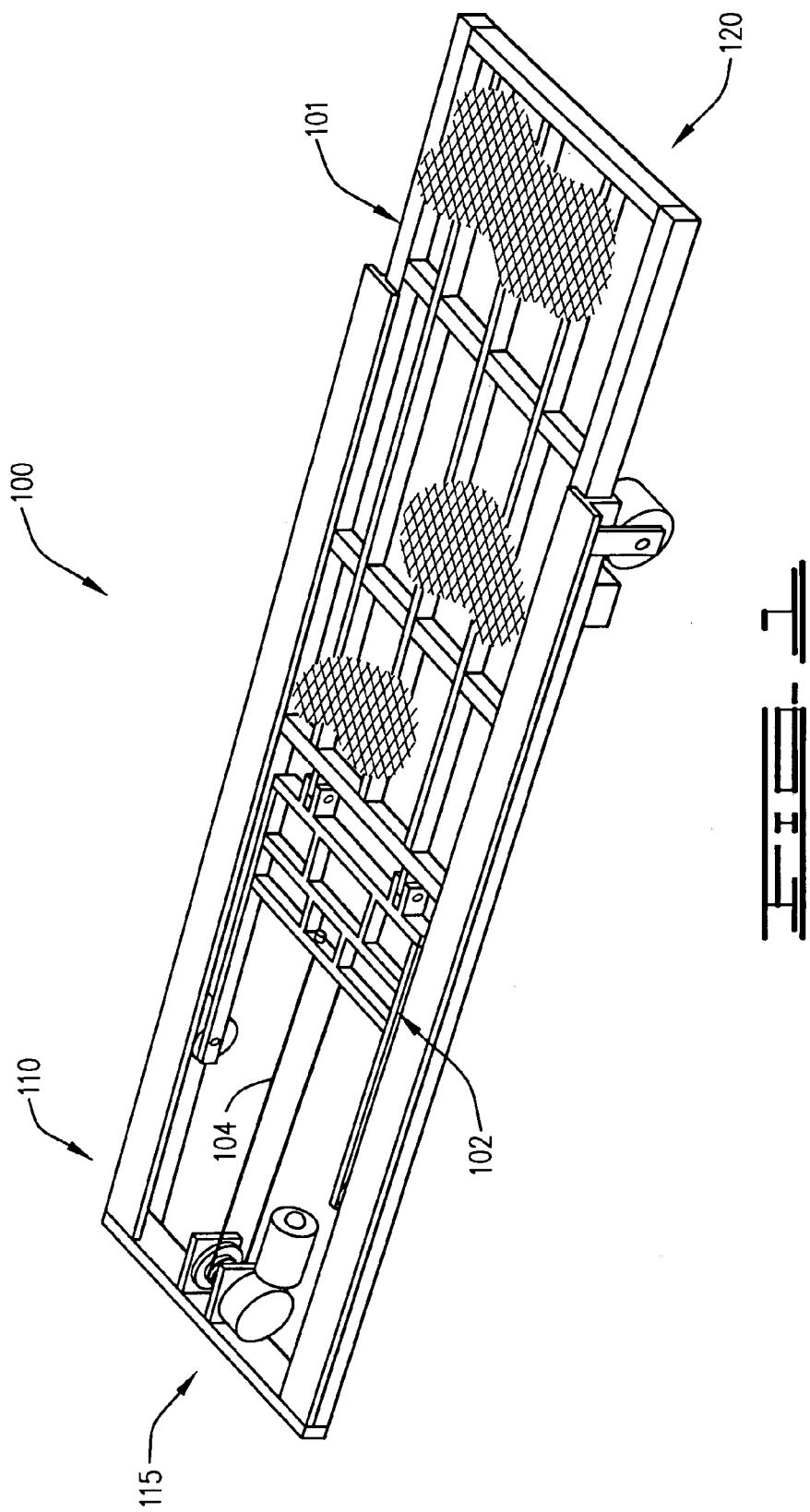
FIG. 1 is a perspective view of an extendable ramp within its supporting frame, according to an embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The invention may be used for applications in which an extendable ramp is required to move materials or personnel between a vehicle and a more stable surface. The invention may find use in the transportation industry, where ramps are used to move goods between the elevated bed of a truck to the ground or a loading dock. It may also find use in the boating industry, where a ramp may be required to extend between a floating vehicle, such as a boat, to the shore or dock, so that people and material can be moved thereon without becoming wet. The invention may also find use for handicapped persons, by providing a handicapped person riding a scooter or personal motorized device a means for entering and exiting a van without requiring manual labor to position a ramp. The invention may also be installed between the bed and the frame of a pickup truck to provide a ramp capability for general utility, commercial, or agricultural use, to allow a user to easily move bulky objects to and from the bed of the pickup truck.

The prior art is replete with different examples of automated, extendable ramps. These devices are generally integrated with the host equipment, e.g. a boat or a truck, so that they are not easily installed or removed. In order to provide structural rigidity and durability, they may be heavy and cumbersome. Furthermore, some of these devices have specialized features to extend the ramp horizontally and then to gently allow the ramp to drop until it encounters a stable surface, with the intent being to prevent abrupt, noisy, or dangerous contact. The extension mechanism may require an involved system of rollers, cables, belts, gears, and pulleys to provide these extension and lowering functions for the ramp.

The inventive extendable ramp system provides a lightweight, uncomplicated device that, because of its thin profile, can be installed in numerous vehicles without undue modification to the vehicle. The apparatus provided by the invention may be structurally rigid and corrosion resistant; its length may be adjusted to the particular application where it is used, while its overall thickness may be kept to a minimum, nominally about 3" to 5". Parts of the ramp that extend beyond this profile may be kept to a minimum. The construction of the extendable ramp apparatus may be simplified by using standard off-the-shelf parts, reducing the number of parts used for the device, and forming the structural parts in such a way as to provide rigidity, light weight, and structural strength. The extension mechanism may comprise a cabling system that provides both shock absorbing functions as well as rapid and simple replacement. It may be powered by a constant speed DC motor that drives an innovative, tapering capstan that allows rapid speed with low power at the beginning of a ramp extension and slower speed and higher power at the end of a ramp extension. Furthermore, at the end of a ramp extension, one or more shock absorbers may be provided to resist the vertical drop of the ramp so that it may gently encounter the solid surface.

Referring now to FIG. 1, an extendable ramp system 100 is shown, where the system 100 comprises a frame 110 that supports a ramp 101 and a carriage 102 arranged for joint, reciprocal movement along the frame 110 provided by a drive mechanism 103. The drive mechanism 103 communicates the reciprocal movement to the carriage 102 and ramp 101 by a cable 104.

A frame 110 is shown in FIGS. 2, 3, and 4, according to one embodiment of the invention, as a basic rectangular structure having a front end 115 and a back end 120. A pair of side members 135 may extend between the front and back ends 115, 120 to provide rigidity of the frame 110 and to define a track along which the carriage 102 and ramp 101 travel, as will be seen presently. The front end 115 may be defined by a front member 125 and the back end 120 may be defined by a back member 130, so that the front and back members 125, 130 may rigidly maintain the side members 135 a spaced distance apart. One or more intermediate members 140 may be affixed to the lower surface of the side members 135 to provide additional structural rigidity to the frame 110.

The side members 135 may be seen in cross-section more clearly in FIG. 4. They may be fabricated in the form of opposing C-shaped channels 145 with an extending flange 141 along the upper surface of the channel 145. Since the cross-sectional area may be constant throughout the length of the side members 135, they may be advantageously fabricated by means of extrusion. They may be comprised of any lightweight material that is amenable to extrusion, such as aluminum, stainless steel, plastics, or graphite fiber material. In the case of aluminum, aircraft grade 1060 aluminum has been found to be extremely resistant to corrosion and is advantageously used in wet environments. In the case of stainless steel, it has been found that further weight reduction can be achieved by providing longitudinal fluting along the vertical portions of the side member, the fluting achieved by removing material from the vertical portions to form oblong holes. In the case of graphite fiber material, the fabrication process may consist of pulling the fibers through a mold in the presence of a binder, or resin matrix; such a process may be termed pultrusion instead of extrusion. However, any process whereby a malleable material is forced through a shaped die, whether that process is termed pultrusion or extrusion, may be used to fabricate the side members 135 without departing from the scope of the invention. Furthermore, the side members 135 may also be fabricated by affixing individual longitudinal portions to one another, as by welding, gluing, braising, and other similar methods.

At the back end 120, a pair of downwardly extending roller members 150 may be affixed to an outer surface 146 of the side members 135 and flush with the underside of the flange 141. The roller members 150 may each provide support for a roller 155 positioned to vertically extend slightly higher than a lower surface of the track 145. Thus any object that may slide along the track 145 may be kept out of contact with the lower surface 147 of the track 145 in the vicinity of the back end 120. Each roller 155 may be supported for rotational movement by an axle 156 extending horizontally from the roller member 150 and positioned horizontally from the roller member 150 by a bushing 157. The axle 156 may be held in place by a pair of nuts 158, although any similar retaining means may be used without departing from the scope of the invention. The back member 130 may support a horizontally-oriented pulley 160 that may be approximately, centrally positioned along the back member 130. The pulley 160 may receive the cable 104 along its circumference, as will presently be seen.

At the front end 115, a rearwardly-extending bracket 116 may be affixed to and supported along a central portion of the front member 125. The bracket 116 may provide support a horizontally-mounted capstan 117 for rotational movement. The capstan 117 may be driven by a motor 119 through a gear reduction means 118. The cable 104 may be wrapped one or more times about the capstan 117 as needed to provide frictional contact thereto, so that the cable 104 may be actuated for reciprocal motion by the motor 119. The motor 119 may be made to operate in two different directions by use of a control switch (not shown). One or more stops 245 may be positioned along the front member 125 to cushion the approach of the carriage 102. Each stop 245 may be configured with a first limit switch (not shown) that may cut power to the motor 119 whenever the carriage 102 encounters the stop 245. A second limit switch (not shown) may be configured with an arbitrary position along the back end 120 to similarly cut power to the motor 119 whenever the ramp 101 extends a desired distance beyond the back end 120. The location of the second limit switch may be selected depending upon the configuration of the ramp and carriage 101, 102 and may be considered to be a design choice to be selected after reasonable experimentation.

Because of the unitary nature of the side members 135, the overall frame 110 may be constructed to provide an exceedingly thin profile for the overall apparatus. The term "profile" means the general volume defined by planes along the upper and lower surfaces of the side members 135. Profiles in the range of from 3" to 5" have been found to be attainable without undue loss of structural strength. Profiles within this range have been found in practice to be advantageous to the configuration of the frame in vehicles where available space is limited. Such profiles do not take into account individual components which may protrude beyond this envelope, such as the motor 119 or the roller members 150.

Referring now to FIGS. 5, 6, and 7, the carriage 102 and ramp 101 are shown as being pivotally connected by hinges 210. The ramp 101 may be a lightweight structure comprised of a pair of longitudinally-extending ramp rails 215 that are interconnected by two or more ramp members 220 to form a simple rectangular form. An upper surface 225 of the ramp 101 may be comprised of any material to provide a continuous or semi-continuous surface upon which materials and people may be moved. The material may comprise wood, solid or stamped sheet metal, quilted sheet metal, expanded metal, or closely spaced rails, or any combination thereof. The upper surface 225 may also be coated as by anodizing, powder coating, or sprayed material so as to resist corrosion, to provide a non-slip surface, provide a pleasing appearance, or any combination thereof. The ramp 101 may lack any projections that may bind, catch, or otherwise prevent the smooth movement of the ramp as it is extended or retracted; notably, the ramp 101 does not contain rollers or pulleys.

The ramp 101 may be reciprocally moved along the tracks 145 by the carriage 102, which may further be actuated by the cable 104. The carriage 102 may be constructed in the shape of a rectangle with one side removed, or a C shape, with two carriage side members 231 aligned along the tracks 145 and held in spaced relationship along one end by a carriage back member 232. Each carriage side member 231 may have a plurality of wheels 235 extending laterally therefrom, with the wheels 235 sized for movable insertion within track 145. The carriage frame defined by the two carriage side members 231 and the carriage back member 232 may be rigidly supported by one or more carriage cross members 233 and one or more carriage brace members 234 in such a way that the cross members and associated shock absorbers 230 are confined to a back portion of the carriage frame, leaving a front portion 236 of the carriage frame unobstructed between the two carriage side members 231.

Referring now to FIGS. 6 and 7, a more detailed view of the carriage 102 and its relationship with the frame 110 may be seen. The shock absorber 230 may be comprised of a strut 250 surrounded by a spring 255 that is held in place by a strut cap 260. One or more shock absorbers 230 may be configured to the carriage 102. Each shock absorber 230 may be supported in a position below the carriage 102 by one or more downwardly extending brackets 261, so that the strut 250 extends through aligned holes in each of the brackets 261 and held in place by standard means well known in the art. The spring 255 is disposed so that, when the strut cap 260 encounters an obstacle, the strut 250 is forced through the holes in brackets 261, thereby compressing the spring 255 between the strut cap 260 and a bracket 261 so as to resist the obstacle. Each shock absorber 230 may be positioned below the carriage 102 so that the strut cap 260 will encounter the back member 130 of the frame 110 at approximately the same time as the carriage 102 travels towards the back end 120, thus preventing further movement in that direction.

Figure 10:
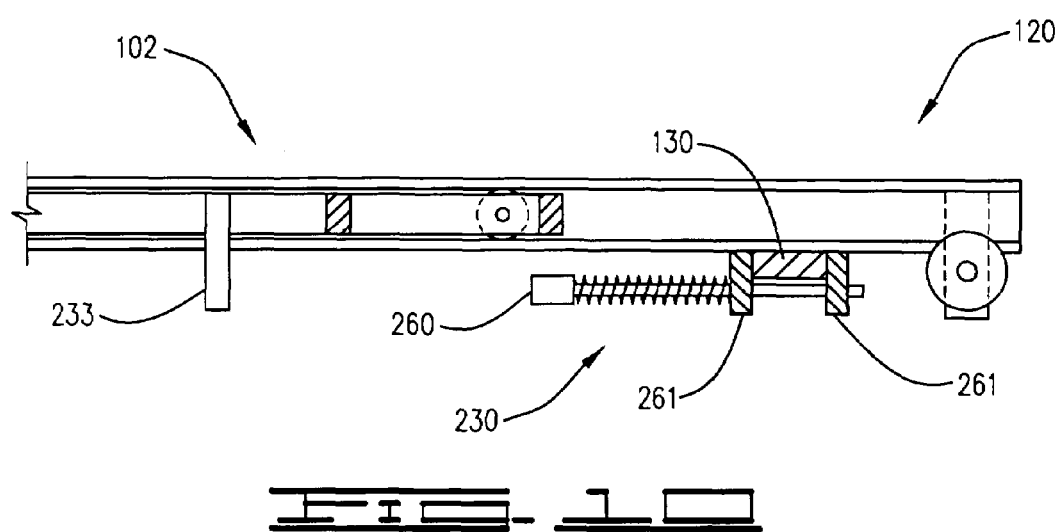
FIG. 10 is a side view of an alternative placement of a shock absorber, according to an embodiment of the invention.

In another embodiment of the invention, the shock absorbers 230 may be mounted on the frame 110, and in particular, on the back member 130. This embodiment may be employed if it is desired to further reduce clearance beneath the carriage 102 or if intermediate members 135 are required but found to interfere with the traversal of the shock absorber 230 thereover. In this embodiment, a forward facing shock absorber 230 may be positioned to encounter a horizontal surface of the carriage 102 as it approaches the back end 120 in a manner similar to that depicted in FIG. 10. One of the carriage cross members 233 may have a surface that extends slightly below the plane of the bottom surface of the carriage, so that it may encounter the strut cap 260 of a shock absorber 230. The precise positioning of the shock absorber 230, the carriage cross member 233, and the bracket 261 supporting the shock absorber 230 and the tension of the shock absorber 230 may be adjusted through simple experimentation to determine the proper spacing and placement that would allow the ramp 101 to slowly descend when extended from the back end 120 of the frame 110.

The ramp and carriage 101, 102 may be configured to the frame 110 by inserting the carriage 102 through the back end 120 of the frame 110, so that the wheels 240 are closely contained within the tracks 145. The ramp 101 may be sized in length so that, when the carriage 102 is positioned at the back end 120 of the frame 110 with the carriage side members 231 abutting the stops 245, the ramp 101 may be supported at its free end by the rollers 155. The ramp rails 215 may thus be confined within the tracks 145 and suspended above the lower surface 147 of the tracks 145.

A tensioning mechanism 265, shown in FIG. 7, may be provided to maintain the cable 104 in a taunt position. The tensioning mechanism 265 may comprise a plunger 267 with surrounding coil spring 266 that is prevented from removal from the plunger 267 by an end plate 269 fixedly attached to a forward end of the plunger 267 and supporting one end of the spring 266. A downwardly extending bracket 270 may have a hole through which the back end of plunger 267 is inserted, thus capturing the spring 266 between the end plate 269 and the bracket 270. Connected to the back end of plunger 267 may be an attachment means 268 that may provide an attachment point for an end of the cable 104. An embodiment of an attachment means 268 may be seen in FIG. 8. Here, the end of the cable 104 may have a button, or some protuberance larger in diameter than the diameter of the cable 104, permanently attached thereto as by swaging. The end having the button may then be inserted into a slot 275 that is wide enough to accept the cable 104 but prevents the button from being pulled through. In this way, the cable 104 can easily be replaced without trouble. The tensioning mechanism 265 may maintain a variable tension on the cable 104 so that no undue stress is placed upon the cable 104 when the carriage 102 approaches either end of the frame and experiences resistance to further movement.

The cable 104 may be arranged to communicate rotary motion of the capstan 117 to provide reciprocal motion to the ramp and carriage 101, 102. The cable 104 may be connected at one end to the tensioning mechanism 265. Thence, it may extend towards the back end 120, around the pulley 160, back towards the front end 115, around the capstan 117 several turns, and then terminated at a carriage cross member 233 by an attachment means 275. The capstan 117 (FIG. 9) may have a tapered barrel 302 between its hubs 301, so that a cable 104 wrapped several turns about the barrel 302 may be observed to travel towards the large end 303 of the barrel 302 when the barrel rotates in a clockwise direction 307 and towards the small end 304 when the barrel 302 rotates in a counterclockwise direction 308. When the cable 104 is wound towards the large end 303 of the barrel 302, then more of the cable 104 comes in contact with the barrel 302 for each revolution, resulting in more rapid movement of the ramp and carriage 101, 102 but less power exerted on the cable 104 due to the increased moment arm. Conversely, when the cable 104 is wound towards the small end 304 of the barrel 302, then more less cable of cable 104 comes in contact with the barrel 302 for each turn, resulting in less rapid movement of the ramp and carriage 101, 102 but more power being exerted on the cable 104 due to the decreased moment arm of the capstan 117. Thus, when a capstan 117 with a tapered barrel 302 is employed within the invention, the choice of orientation of the tapered barrel 302, direction of rotation of the barrel 302, position of the cable 104 on the barrel 302, and number of turns of the cable 104 about the barrel 102 may be advantageously chosen so that the cable moves in a direction 305 towards the large end 303 when the ramp and carriage 101, 102 are being retracted, and the cable moves in a direction 306 towards the small end 304 when the ramp and carriage 101, 102 are being extended.

In operation, the motor 119 may be energized by a control means having a three switch position that may direct the motor to either turn off, turn in a clockwise direction, or turn in a counterclockwise direction. If the ramp and carriage 101, 102 are at the front end 115, then one of the clockwise or counterclockwise switch positions, but not both, will result in no movement of the ramp and carriage 101, 102, since the carriage would be forced against the limit switch at the front end 115 which would immediately deenergize the motor. The other switch position, either counterclockwise or clockwise switch position, would result in movement of the ramp and carriage 101, 102 towards the back end 120 of the frame 110. The choice of which switch position results in rearward motion may be a design choice and dependent upon the orientation of the motor 119 and the capstan 117.

As the ramp 101 horizontally extends beyond the back end 120, with the rollers 155 serving as a fulcrum and the extended portion of the ramp 101 serving as a lever, the downward force exerted on the extended end of the ramp 101 by the force of gravity increases, resulting in an increasing, horizontally directed component of force being exerted against the cable 104. As the carriage 102 approaches the back end 120, the strut caps 260 of the shock absorbers 230 may encounter the back member 130 of the frame 110, resulting in an opposing force against this horizontally directed component of force. This opposing force exerted by the shock absorbers 230 may allow the carriage movement to slow down as it approaches the back end 120, so that the extended portion of the ramp 101 may pivot downwardly about the rollers 155 and allow the end of the extended ramp 101 to encounter the solid surface without undue shock. Use of a tapered barrel 302 working in cooperation with the shock absorbers 230 may also provide additional power to resist the downward movement of the extended ramp 101. The second limit switch may be encountered before the wheels 240 of the carriage 101 encounter the rollers 155, the ramp 101 is extended an unacceptable distance beyond the frame 110, or both.

Retraction of the ramp and carriage 101, 102 may be performed in a manner similar to that of extension of the ramp 101. The motor 119 may be energized through the control means by selecting the switch position that was not selected for extension of the ramp 101. As the cable 104 pulls the carriage 102 back towards the front end 115, the ramp 101 may be levered over the rollers 155 serving as a fulcrum and pulled back into the tracks 145 of the frame 110. The carriage 102 may encounter the first limit switch as it approaches the front end 115, which would deenergize the motor 119.

An innovative extendable ramp has thus been presented. This invention may also find application in a number of areas that require a ramp to easily traverse the distance between a vehicle and a solid surface. Such applications may be the use on trailer trucks for extending a ramp to allow small machinery and/or goods to be loaded therein. It may also be used in the aircraft industry for servicing vehicles that must move supplies and provisions to and from the aircraft. Other uses may suggest themselves without departing from the scope of this invention.

While the invention has been illustrated by disclosing a number of embodiments herein and described in detail in the drawings and foregoing description, the same is to be considered as illustrative and not restrictive in character. It should be understood that only the preferred embodiments have been shown and described and that all changes and modifications that come within the spirit of the invention are desired to be protected. With respect to the above description, it should be further understood that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

We claim:

1. An extendable ramp apparatus comprising
   a frame with a front end, a back end, and two tracks each extending between the front end and the back end, the frame having a roller aligned with each track and positioned at the back end;
   a ramp with a first ramp end and a second ramp end;
   a carriage with a plurality of wheels engaging the tracks for reciprocal movement thereon, the carriage being pivotally attached to the first ramp end, the carriage oriented proximate the front end, the ramp oriented proximate the back end, wherein the ramp is supported by the carriage and the rollers; and
   a motor attached to the frame, the motor arranged to move the carriage in a first direction towards the back end and in a second direction towards the front end, the motor controlled by a switch having a first position causing the carriage to move in the first direction and a second position causing the carriage to move in the second direction.

2. The apparatus described in claim 1, further comprising
   a first position, wherein the carriage and the ramp are between the front end and the back end, the ramp supported by the carriage and the rollers; and
   a second position, wherein the carriage is positioned at the back end and the ramp extends horizontally beyond the frame and pivots downwardly from the carriage to encounter a surface.

3. The apparatus described in claim 1, further comprising
   a capstan being actuated for rotation by the motor; and
   a cable connected to the capstan and to the carriage, the cable causing the carriage to move in the first direction in response to the first switch position, the cable causing the carriage to move in the second direction in response to the second switch position.

4. The apparatus described in claim 3, wherein
   the cable with a first cable end and a second cable end, the cable connected to the capstan by winding the cable about the capstan, the first cable end extending from the capstan and connected to the carriage, and the second cable end extending from the capstan to the front end, around a pulley fixedly attached to the front end, and connected to the carriage.

5. The apparatus described in claim 4, further comprising a tensioning mechanism attached to the carriage, the second cable end being attached to the tensioning mechanism, wherein tension is maintained on the cable by the tensioning mechanism.

6. The apparatus described in claim 4, wherein the capstan has a barrel with a thick end and a thin end, the capstan oriented so that the cable moves about the capstan towards the thick end as the carriage is moved in the second direction and the cable moves about the capstan towards the thin end when the carriage is moved in the first direction.

7. The apparatus described in claim 1, further comprising
   a shock absorber attached to the carriage, the shock absorber disposed to arrest movement of the carriage proximate the back end as the carriage moves in the first direction, wherein the wheels are prevented from encountering the rollers.

8. The apparatus described in claim 1, further comprising
a first limit switch positioned at the back end, the first limit switch disposed to deenergize the motor when the carriage encounters the first limit switch while moving in the first direction, and
a second limit switch positioned at the front end, the second limit switch disposed to deenergize the motor when the carriage encounters the second limit switch while moving in the second direction.

9. The apparatus described in claim 1, wherein the motor is affixed along the front end within a profile of the frame.

10. The apparatus described in claim 1, wherein a profile of the frame is within a range of about 3" to about 5".

11. The apparatus described in claim 1, wherein each track is an extruded unitary member.

12. The apparatus described in claim 11, wherein the extruded unitary member is composed of a material selected from a group consisting of aluminum, stainless steel, and plastic, and graphite fibers.

13. The apparatus described in claim 1, wherein the ramp comprises a rectangular frame with an upper surface of expanded metal.

14. An extendable ramp apparatus for use beneath a horizontal surface, the apparatus comprising:
a frame having a front member, a back member, and two side members extending between the front member and the back member, each side member with a track, the frame having a roller aligned with each track proximate the back member, the frame having a profile;
a motor mounted on the front member within the profile of the frame;
a carriage within the profile of the frame, the carriage having two opposed carriage side members aligned with the tracks, each carriage side member with a first end proximate the back member of the frame and a second end proximate the front member of the frame, the carriage side members held in spaced relationship by a carriage back member fixedly attached to the opposed first ends and by one or more carriage cross members proximate the carriage back member, each carriage side member with a plurality of wheels supporting the carriage side member within each track for reciprocal movement of the carriage along the tracks, wherein the motor does not come into contact with the carriage when the second ends of the carriage side members contact the front member;
a ramp within the profile of the frame, the ramp having a first ramp end and a second ramp end, the first ramp end pivotally connected with the carriage back member, and the second ramp end supported by the rollers;
wherein the motor is disposed to selectively move the carriage and ramp in a first direction and a second direction along the tracks.

15. The apparatus described in claim 14, wherein apparatus further comprises
a capstan attached to the front member within the profile of the frame, the capstan disposed for rotational actuation by the motor;
a cable with a first cable end and a second cable end, the cable wrapped one or more times around the capstan with the first cable end and the second cable end extending from the capstan, the first cable end extending to the carriage for fixed attachment, the second cable end extending to the back member, around a pulley attached for rotational movement to the back member, and thence to the carriage for attachment.

16. The apparatus described in claim 15, wherein the second cable end is fixedly attached to a tensioning mechanism associated with the carriage, wherein the tensioning mechanism maintains variable tension on the cable.

17. The apparatus described in claim 16, wherein the tensioning mechanism comprises
a plunger supported below the carriage by a bracket, the plunger capturing a coil spring between the bracket and a plate affixed to a first end of the plunger, a second end of the plunger fixedly attached to the second cable end.

* * * * *